A. P. WITTEN

May 12, 1931. Re. 18,068

METHOD OF ORNAMENTING TOY BALLOONS

Original Filed March 14, 1929

INVENTOR

BY Arthur P. Witten.

F. E. Shannon ATTORNEY

Reissued May 12, 1931

Re. 18,068

UNITED STATES PATENT OFFICE

ARTHUR P. WITTEN, OF AKRON, OHIO, ASSIGNOR TO GEORGE E. HALL AND HIMSELF, OF AKRON, OHIO

METHOD OF ORNAMENTING TOY BALLOONS

Original No. 1,762,603, dated June 10, 1930, Serial No. 346,835, filed March 14, 1929. Application for reissue filed December 31, 1930. Serial No. 505,918.

This invention relates to the art of manufacturing thin rubber articles and, while adapted for use generally wherever it may be advantageously applied, it is particularly intended for use in manufacturing ornamental rubber toy balloons in which connection it will be herein illustrated and described.

Objects of the invention are, to provide a new and improved economical method of manufacturing an ornamental rubber article which may be easily followed with the use of simple, inexpensive apparatus and which may be employed to produce an article of unique, exceedingly attractive appearance.

In the drawing I have illustrated simple instrumentalities for carrying my improved process into effect it being understood that any suitable instrumentalities may be employed and that changes and modifications may be made or resort had to substitutions which come within the spirit of the invention as set forth in the claims hereunto appended.

In the drawings like characters of reference are employed to designate like parts as the same may appear in any of the several views and in which:—

Figure 1:
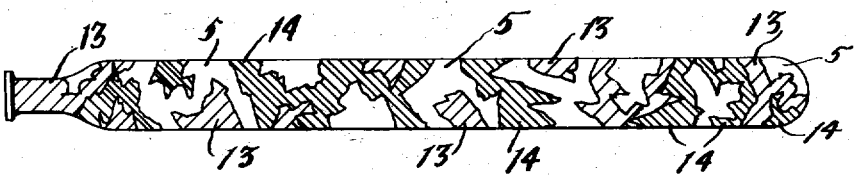
Figure 1 is a side elevational view representing roughly or schematically the appearance of an ornamental rubber balloon treated in accordance with this invention.
Figure 2:
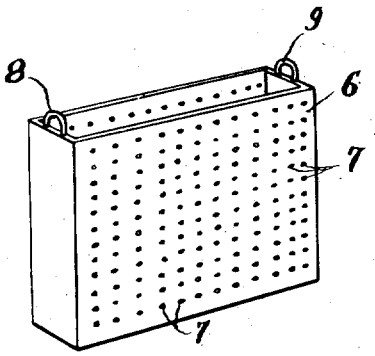
Figure 2 is a perspective view of one of the devices employed in carrying out the invention.
Figure 3:
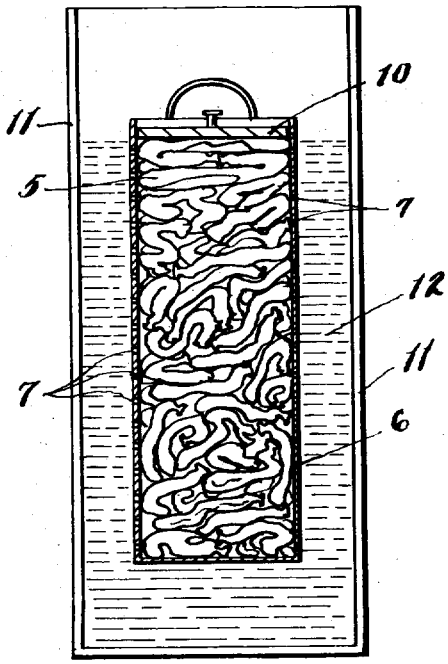
Figure 3 is a vertical, sectional view illustrating one of the steps in my improved process.

In carrying out my improved process, the rubber article is first formed and vulcanized. This article is preferably formed of a light color to contrast with the darker colors used in ornamenting the same as hereinafter described. In Figure 1 I have illustrated a balloon which was formed by successively dipping a form in a white rubber solution. A plurality of balloons are thus formed, vulcanized in the ordinary manner and removed from the forms. The balloons are first thoroughly washed to remove any grease, glycerin, soapstone or other substance which might prevent color from properly adhering thereto. The balloons are then thoroughly dried and are gathered and packed haphazardly in a container 6. The container 6 is in the form of a narrow, rectangular box having side walls provided with a multiplicity of spaced openings 7.

The container 6 is open at the top and is provided on each end thereof with suitable handles 8 and 9. A lid or plunger 10 is then placed on the balloons and is pressed downwardly to hold the balloons together as a compressed mass or in packed relation. The balloons as thus packed in the container 6 will be in a folded, wrinkled condition and will extend in all directions. The container 6 is then dipped in a tank 11 in which has been placed a pool bath of colored solution 12. While the solution 12 may be formed of any suitable ingredients, I prefer to use an oil soluble dye dissolved in an oil spirit such as naphtha or other suitable solvent, because such a solution is more penetrative, quick-acting and quick-drying, it has a greater affinity for the vulcanized rubber of which the balloons are made and it is less likely to imprint a stencil pattern of the perforated container on the balloons in contact with the latter than, for example, a water-soluble dye.

While the container 6 is thus immersed in the colored solution 12, the solution enters the container 6 through the openings or perforations 7 and penetrates by interfacial action wherever it can reach between the container and the balloons and into the packed mass of balloons. As the balloons are folded into all conceivable shapes and extend haphazardly in all directions, the colored solution 12 finds numerous irregular voids or channels into which it can flow by gravity and capillary action and other areas from which it is excluded by the interfacial pressure. Hence it is deposited on each balloon in irregular splotches. The container 6 is then removed from the solution 12 and the balloons are removed from the container 6 and are thoroughly dried.

While this forms a balloon of unique attractive appearance, the process is preferably continued by taking the balloons which have been subjected to the solution 12 and again confining the same in packed relation in the container under compression with the lid 10 and dipping the container in a second solution 12 of a contrasting color; then removing the balloons from the container 6 and thoroughly drying the same. This second dipping will likewise deposit the second colored solution on the balloon in irregular splotches and as the contrasting splotches will overlap, a very attractive mottled effect is produced.

In Figure 1 I have shown approximately the appearance of a balloon which was formed with a white body and which was first dipped in a colored solution as hereinbefore described to form the splotches 13 and was then likewise dipped into a contrasting colored solution to form the splotches 14. It will be understood, however, that this illustration is merely schematic. A practically infinite number of intricate, splotchy patterns are obtainable by this process, the variety being much greater and the method performable more quickly, on a larger scale and with less skilled labor than the prior method of ornamenting rubber toy balloons by tying a few of them together in a bundle, dipping the bundles in a solution of coloring material in hot water, rinsing, untying and drying.

Obviously, any suitable colors may be used and rubber articles may be thus subjected to one, two or more dippings in accordance with the effect desired.

It will thus be seen that I have provided a simple, inexpensive process of manufacture which may be followed to produce a balloon of attractive appearance.

Having thus illustrated my improved process what I claim as new and desire to secure by Letters Patent is:—

1. That method of ornamenting thin rubber articles which comprises haphazardly gathering a plurality of the articles, packing the same in an enclosed space, and subjecting the same while so confined to a bath of colored solution.

2. That method of ornamenting thin rubber articles which comprises packing a plurality of the articles within an enclosed space, subjecting the articles while so confined to a bath of colored solution, removing the excess solution from the articles, releasing the articles from confinement and permitting the same to dry.

3. That method of ornamenting thin rubber articles which comprises haphazardly gathering a plurality of the articles, confining the same in an enclosed space, immersing the same while so confined in a colored solution, removing the articles from the solution, releasing the articles from confinement and permitting the same to dry.

4. That method of ornamenting thin rubber articles which comprises haphazardly packing a plurality of the articles in a confined space and dipping the same while so confined in a pool bath of colored solution.

5. That method of ornamenting thin rubber articles which comprises closely confining the articles within an enclosed space, dipping the articles while so confined into a pool bath of colored solution, removing the articles from the solution, drying the articles, then again closely confining the articles in an enclosed space and dipping the same in a pool bath of solution of a color contrasting with the first named solution.

6. That method of ornamenting thin rubber articles which comprises confining the articles within an enclosed space, subjecting the same while so confined to a colored solution, releasing the articles from confinement, drying the solution deposited thereon, again confining the articles in an enclosed space and subjecting the articles to a contrasting colored solution.

7. The method of ornamenting thin rubber articles which comprises packing a plurality of the articles in a confined space, and subjecting the mass to a bath of a solution of an oil-soluble dye, thereby producing interfacial penetration of the mass and deposit of the color irregularly upon the articles.

8. The method of ornamenting thin rubber articles which comprises haphazardly packing a plurality of the articles in a confined space, and subjecting the mass to a quick-penetrating bath of a solution of a dye in naphtha.

In testimony whereof I have hereunto set my hand.

ARTHUR P. WITTEN.